United States Patent
Trovo et al.

(10) Patent No.: US 12,544,397 B2
(45) Date of Patent: Feb. 10, 2026

(54) COMPOSITIONS AND METHODS CONTAINING N-ACETYLCYSTEIN AND NICOTINAMIDE RIBOSIDE FOR PREVENTION AND TREATMENT OF NEUROLOGICAL DISEASES AND CONDITIONS

(71) Applicant: SOCIETE DES PRODUITS NESTLE S.A., Vevey (CH)

(72) Inventors: Laura Trovo, Paudex (CH); Bernard Cuenoud, Cully (CH); Pascal Steiner, St. Louis, MO (US); Nicolas Preitner, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 684 days.

(21) Appl. No.: 17/907,160

(22) PCT Filed: Apr. 1, 2021

(86) PCT No.: PCT/EP2021/058554
§ 371 (c)(1),
(2) Date: Sep. 23, 2022

(87) PCT Pub. No.: WO2021/198399
PCT Pub. Date: Oct. 7, 2021

(65) Prior Publication Data
US 2023/0346818 A1   Nov. 2, 2023

(30) Foreign Application Priority Data
Apr. 1, 2020   (EP) .................................... 20167536

(51) Int. Cl.
| | | |
|---|---|---|
| *A61K 31/706* | (2006.01) |
| *A61K 31/198* | (2006.01) |
| *A61K 31/405* | (2006.01) |
| *A61K 31/455* | (2006.01) |
| *A61P 25/00* | (2006.01) |

(52) U.S. Cl.
CPC .......... *A61K 31/706* (2013.01); *A61K 31/198* (2013.01); *A61K 31/405* (2013.01); *A61K 31/455* (2013.01); *A61P 25/00* (2018.01)

(58) Field of Classification Search
None
See application file for complete search history.

(56) References Cited

FOREIGN PATENT DOCUMENTS

| CN | 112654264 A | 4/2021 |
|---|---|---|
| JP | 2007517026 A | 6/2007 |
| WO | 2014025905 | 2/2014 |
| WO | 2016149277 | 9/2016 |
| WO | 2016191468 | 12/2016 |
| WO | 2017062311 | 4/2017 |

OTHER PUBLICATIONS

"Orange Mango Flavor Athletic Supplement", Mintel, Record Id 3546203, Nov. 2015, 5 Pages.
Japanese Office Action for Appl No. 2022-554911 dated Feb. 25, 2025, 6 pages.
Chinese Office Action for Appl No. 202180020841.7 dated Nov. 5, 2024, 8 pages.

*Primary Examiner* — Patrick T Lewis
(74) *Attorney, Agent, or Firm* — K&L Gates LLP

(57) ABSTRACT

The present invention provides compositions containing at least one N-acetyl cysteine and at least one nicotinamide riboside for use in methods of prevention and/or treatment of neurological disease and/or conditions. In one embodiment of the invention, said compositions of the invention maintain or improve brain function, in particular brain energy deficits. In another embodiment of the invention, compositions of the invention improve neurological recovery and regeneration after injury or surgery. In another embodiment of the invention compositions of the invention may be used in methods to prevent and/or treat neurological diseases and/or conditions and/or recovery after injury or surgery.

15 Claims, 3 Drawing Sheets

COMPOSITIONS AND METHODS CONTAINING N-ACETYLCYSTEIN AND NICOTINAMIDE RIBOSIDE FOR PREVENTION AND TREATMENT OF NEUROLOGICAL DISEASES AND CONDITIONS

CROSS REFERENCE TO RELATED APPLICATIONS

The present application is a National Stage of International Application No. PCT/EP2021/058554, filed on Apr. 1, 2021, which claims priority to European Patent Application No. 20167536.0, filed on Apr. 1, 2020, the entire contents of which are being incorporated herein by reference.

FIELD OF THE INVENTION

The present invention provides compounds and compositions containing cysteine and nicotinamide riboside for use in methods of prevention and/or treatment of neurological disease and/or conditions. In one embodiment of the invention, said compounds and compositions of the invention maintain or improve brain function, in particular brain energy deficits. In another embodiment of the invention, compounds and compositions of the invention improve neurological recovery and regeneration after injury or surgery. In another embodiment of the invention, compounds and compositions of the invention may be used in methods to prevent and/or treat neurological diseases and/or conditions and/or recovery after injury or surgery.

BACKGROUND TO THE INVENTION

Population aging has been a remarkable demographic event. As the growth of the older population has outpaced the total population due to increased longevity, the proportion of older persons relative to the rest of the population has increased considerably. For example, one in every twelve individuals was at least 60 years of age in 1950, and one in every ten was aged 60 years or older by the end of 2000. By the end of 2050, the number of persons worldwide that is 60 years or over is projected to be one in every five.

Aged or aging individuals frequently suffer some degree of cognitive impairment, including decline in cognitive function, that progresses with age, and age-related changes in brain morphology and cerebrovascular function are commonly observed. Cognitive decline has been consistently reported with aging across a range of cognitive domains including processing speed, attention, episodic memory, spatial ability and executive function. Brain imaging studies have revealed that these normal age-related cognitive declines are associated with decreases in both grey and white matter volume in the brain, with the fronto-striatal system most heavily compromised with aging. These decreases in cortical volume can be attributed to a number of detrimental cellular processes involved with normal aging, such as accumulation of damage by free radicals over time leading to oxidative damage, chronic low-grade inflammation, homocysteine accumulation (which when elevated are a risk factor for cognitive impairment and dementia), and decreased mitochondrial efficiency. In addition to direct cellular damage, the brain is also indirectly impaired by insults to micro-vascular structures. It is evident that the pathology of aging and also dementia involves a complexity of these interacting factors which are linked together. For example, mitochondrial dysfunction leads to increased oxidative stress, and oxidative stress can trigger inflammation and vascular insults.

Furthermore, cognitive decline is an early predictor or Alzheimer pathology and begins before the onset of dementia. In this context, the cognitive composite score represents a reliable means to assess the cognitive decline preceding dementia. Considerable evidence suggests that maintaining brain health and preventing cognitive decline with advancing age may prevent or delay development of dementia due to Alzheimer's disease and other aged related neuropathologies.

In biology and psychology, the term "stress" refers to the consequence of the failure of a human or other animal to respond appropriately to physiological, emotional, or physical threats, whether actual or imagined. The psychobiological features of stress may present as manifestations of oxidative stress, i.e., an imbalance between the production and manifestation of reactive oxygen species and the ability of a biological system readily to detoxify the reactive intermediates or to repair the resulting damage. Disturbances in the normal redox state of tissues can cause toxic effects through the production of peroxides and free radicals that damage all of the components of the cell, including proteins, lipids, and DNA. Some reactive oxidative species can even act as messengers through a phenomenon called "redox signaling."

In humans, oxidative stress is involved in many diseases. Examples include atherosclerosis, Parkinson's disease, heart failure, myocardial infarction, Alzheimer's disease, schizophrenia, bipolar disorder, fragile X syndrome, and chronic fatigue syndrome.

One source of reactive oxygen under normal conditions in humans is the leakage of activated oxygen from mitochondria during oxidative phosphorylation. Other enzymes capable of producing superoxide ($O2-$) are xanthine oxidase, NADPH oxidases and cytochromes P450. Hydrogen peroxide, another strong oxidizing agent, is produced by a wide variety of enzymes including several oxidases. Reactive oxygen species play important roles in cell signaling, a process termed redox signaling. Thus, to maintain proper cellular homeostasis a balance must be struck between reactive oxygen production and consumption.

Oxidative stress contributes to tissue injury following irradiation and hyperoxia. It is suspected to be important in neurodegenerative diseases, including Alzheimer's disease, Parkinson's disease, amyotrophic lateral sclerosis (ALS), and Huntington's disease.

Moreover, the free radical theory of aging suggests that the biological process of aging results in increased oxidative stress in elderly humans. The ability of a cell to resist the damaging potential of oxidative stress is determined by a vital balance between generation of oxidant free radicals and the defensive array of antioxidants available to the cell. There are multiple antioxidant defense systems and of these, glutathione (GSH) is the most abundant intracellular component of overall antioxidant defenses. GSH, a tripeptide, is synthesized from precursor amino-acids glutamate, cysteine, and glycine in two steps catalyzed by glutamate cysteine ligase (GCL, also known as gamma-glutamylcysteine synthetase, EC 6.3.2.2) and gamma-L-glutamyl-L-cysteine:glycine ligase (also known as glutathione synthetase, EC 6.3.2.3), and GSH synthesis occurs de novo in cells.

Also, NAD+ plays an important role in neurological development, regeneration, aging and disease. NAD+ mediates multiple biological processes in brains, such as neurotransmission and learning and memory. NAD+ may also mediate brain aging and the tissue damage in various brain illnesses. NADH can be transported across the plasma membranes of astrocytes, and NAD+ administration can markedly decrease ischemic brain injury (Ying et al. "NAD (+) and NADH in brain functions, brain diseases and brain aging" February 2007, Frontiers in Bioscience 12 (5): 1863-88.). Lower NAD+ levels may be deleterious for brain health while higher NAD+ levels are known to augment brain health. Therefore, there is an urgent unmet need to address neurological disease and/or conditions with new compounds, compositions and methods of prevention and/or treatment which influence these pathways.

SUMMARY OF THE INVENTION

The present invention provides compositions comprising a combination of at least one N-acetylcysteine or functional derivative thereof, and at least one nicotinamide riboside or NAD+ precursor, the composition comprises the combination in an amount effective to prevent and/or treat neurological diseases or conditions.

In an embodiment, the combination is administered orally or enterally, via nasogastric tube.

In an embodiment, the composition is selected from the group consisting of: a food or beverage product, a food supplement, functional foods, an oral nutritional supplement (ONS), a medical food, a food for special medical purposes (FSMP), nutraceuticals, a dietary supplement, a ready to drink formula, a low-volume liquid supplement, powder formats for liquid reconstitution, a meal replacement beverage and combinations thereof.

In another embodiment, the composition does not contain Glycine or functional derivatives.

In a further embodiment, the composition can improve glucose uptake/utilization in the brain and provide one or more benefits to neurological function and/or brain function.

In one embodiment of the invention, the composition is provided to maintain or increase brain function in a subject.

In yet another embodiment of the invention, the composition is provided to enhance neurological recovery after injury or surgery.

In another embodiment, the present disclosure provides a method maintaining cognitive function in a healthy older adult. The method comprises administering to the healthy older adult an effective amount of a combination of a NAD+ precursor and at least one N-Acetyl cysteine or functional derivative. The healthy older adult can be elderly.

In another embodiment of the invention, the composition is a nutritional composition containing at least one N-acetyl cysteine or functional derivative thereof and at least one nicotinamide riboside or NAD+ precursor wherein increased neurological function in the brain is measured by, for example, suitable neurological and cognitive tests, brain image analysis and clinical examination.

In an embodiment, the at least one N-acetyl cysteine or functional derivative thereof and the at least one nicotinamide riboside or NAD+ precursor are administered in the same composition.

In an embodiment, one or more of the at least one N-acetylcysteine or functional derivative thereof, and the at least one nicotinamide riboside or NAD+ precursor are administered in a different composition.

DETAILED DESCRIPTION OF THE INVENTION

Definitions

All percentages expressed herein are by weight of the total weight of the composition unless expressed otherwise.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this invention and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. Any embodiment disclosed herein can be combined with any other embodiment disclosed herein.

Where used herein, the terms "example" and "such as," particularly when followed by a listing of terms, are merely exemplary and illustrative and should not be deemed to be exclusive or comprehensive. As used herein, a condition "associated with" or "linked with" another condition means the conditions occur concurrently, preferably means that the conditions are caused by the same underlying condition, and most preferably means that one of the identified conditions is caused by the other identified condition.

The terms "food," "food product" and "food composition" mean a product or composition that is intended for ingestion by an individual such as a human and provides at least one nutrient to the individual. A food product typically includes at least one of a protein, a lipid, a carbohydrate and optionally includes one or more vitamins and minerals. The term "beverage" or "beverage product" means a liquid product or liquid composition that is intended to be ingested orally by an individual such as a human and provides at least one nutrient to the individual.

The compositions of the present disclosure, including the many embodiments described herein, can comprise, consist of, or consist essentially of the elements disclosed herein, as well as any additional or optional ingredients, components, or elements described herein or otherwise useful in a diet.

As used herein, the term "isolated" means removed from one or more other compounds or components with which the compound may otherwise be found, for example as found in nature. For example, "isolated" preferably means that the identified compound is separated from at least a portion of the cellular material with which it is typically found in nature. In an embodiment, an isolated compound is free from any other compound.

"Prevention" includes reduction of risk, incidence and/or severity of a condition or disorder. The terms "treatment," "treat" and "to alleviate" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The term does not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment," "treat" and "to alleviate" are also intended to include the potentiation or otherwise enhancement of one or more primary prophylactic or therapeutic measure. The terms "treatment," "treat" and "to alleviate" are further intended to include the dietary management of a disease or condition or the dietary management for prophylaxis or prevention a disease or condition. A treatment can be patient- or doctor-related.

The term "unit dosage form," as used herein, refers to physically discrete units suitable as unitary dosages for human and animal subjects, each unit containing a predetermined quantity of the composition disclosed herein in an amount sufficient to produce the desired effect, in association with a pharmaceutically acceptable diluent, carrier or vehicle. The specifications for the unit dosage form depend on the particular compounds employed, the effect to be achieved, and the pharmacodynamics associated with each compound in the host.

As used herein, an "effective amount" is an amount that prevents a deficiency, treats a disease or medical condition in an individual, or, more generally, reduces symptoms, manages progression of the disease, or provides a nutritional, physiological, or medical benefit to the individual. The relative terms "improve," "increase," "enhance," "promote" and the like refer to the effects of the composition disclosed herein, namely a composition comprising at least one N-acetyl cysteine or functional derivative thereof and at least one nicotinamide riboside or NAD+ precursor, relative to a composition not having nicotinamide riboside but otherwise identical. As used herein, "promoting" refers to enhancing or inducing relative to the level before administration of the composition disclosed herein.

A "subject" or "individual" is a mammal, preferably a human. The term "elderly" in the context of a human means an age from birth of at least 60 years, preferably above 63 years, more preferably above 65 years, and most preferably above 70 years. The term "older adult" in the context of a human means an age from birth of at least 45 years, preferably above 50 years, more preferably above 55 years, and includes elderly individuals.

As used herein, "cognitive performance" refers to how well a subject performs one or more cognitive function. As used herein, "cognitive function" refers to any mental process by which one becomes aware of, perceives, or comprehends ideas. It involves all aspects of perception, thinking, reasoning, and remembering and includes, for example, perception, memory, attention, speech comprehension, speech generation, reading comprehension, creation of imagery, learning, and reasoning. Ordinarily it will refer to at least memory.

Methods for measuring cognitive function are well-known and can include, for example, individual or battery tests for any aspect of cognitive function. One such test is the Prudhoe Cognitive Function Test by Margallo-Lana et al. (2003) J. Intellect. Disability Res. 47:488-492. Another such test is the Mini Mental State Exam (MMSE), which is designed to assess orientation to time and place, registration, attention and calculation, recall, language use and comprehension, repetition, and complex commands. Folstein et al. (1975) J. Psych. Res. 12:189-198. Other tests useful for measuring cognitive function include the Alzheimer Disease Assessment Scale-Cognitive (ADAS-Cog) (Rosen et al. (1984) Am. J. Psychiatry. 141 (11): 1356-64) and the Cambridge Neuropsychological Test Automated Battery (CANTAB) (Robbins et al. (1994) Dementia. 5 (5): 266-81), Montreal Cognitive assessment (MoCA) (Ciesielska N. et al. 2016: DOI: 10.12740/PP/45368 and Carson N. et al. 2018: DOI: 10.1002/gps.4756). Such tests can be used to assess cognitive function in an objective manner, so that changes in cognitive function, for example in response to treatment in accordance with methods disclosed herein, can be measured and compared.

As used herein, a "cognitive disorder" refers to any condition that impairs cognitive function. Non-limiting examples of a cognitive disorder include delirium, dementia, learning disorder, attention deficit disorder (ADD), and attention deficit hyperactivity disorder.

Neurological Diseases and Conditions

As used herein, the term "neurological condition" refers to a disorder of the nervous system. Neurological conditions may result from damage to the brain, spinal column or nerves, caused by illness or injury. Non-limiting examples of the symptoms of a neurological condition include paralysis, muscle weakness, poor coordination, loss of sensation, seizures, confusion, pain and altered levels of consciousness. An assessment of the response to touch, pressure, vibration, limb position, heat, cold, and pain as well as reflexes can be performed to determine whether the nervous system is impaired in a subject.

Some neurological conditions are life-long, and the onset can be experienced at any time. Other neurological conditions, such as cerebral palsy, are present from birth. Some neurological conditions, such as Duchenne muscular dystrophy, commonly appear in early childhood, while other neurological conditions, such as Alzheimer's disease and Parkinson's disease, affect mainly older people. Some neurological conditions have a sudden onset due to injury or illness, such as a head injury or stroke, or cancers of the brain and spine.

In an embodiment, the neurological condition is the result of traumatic damage to the brain. Additionally, or alternatively, the neurological condition is the result of an energy deficiency in the brain or in the muscles.

Examples of neurological conditions include migraine, memory disorder, age-related memory disorder, brain injury, neurorehabilitation, stroke and post-stroke, amyloid lateral sclerosis, multiple sclerosis, cognitive impairment, mild cognitive impairment (MCI), cognitive impairment post-intensive care, age-induced cognition impairment, Alzheimer's disease, Parkinson's disease, Huntingdon's disease, inherited metabolic disorders (such as glucose transporter type 1 deficiency syndrome and pyruvate dehydrogenase complex deficiency), bipolar disorder, schizophrenia, and/or epilepsy.

It may be appreciated that the compounds, compositions and methods of the present invention may be beneficial to prevent and/or treat neurological conditions listed above, in particular, to maintain or improve brain or nervous system function.

Migraine

A migraine is an intense headache accompanied by other symptoms such as nausea (feeling sick), visual problems and an increased sensitivity to light or sound. A migraine may be preceded by an aura; the main symptoms of an aura are visual problems such as blurred vision (difficulty focusing), blind spots, flashes of light, or a zigzag pattern moving from the central field of vision towards the edge.

It may be appreciated that the compounds, compositions and methods of the present invention may be beneficial to prevent and/or treat migraine or its neurological symptoms.

Stroke

Strokes (also known as cerebrovascular accident (CVA) and cerebrovascular insult (CVI)) occur when there is poor blood flow to the brain resulting in cell death. There are two main types of stroke: ischemic (due to lack of blood flow) and haemorrhagic (due to bleeding). Strokes result in part of the brain not functioning properly. The signs and symptoms of a stroke may include an inability to move or feel on one side of the body, problems understanding or speaking, feeling like the world is spinning, or loss of vision to one side. The signs and symptoms often appear soon after the stroke has occurred.

It may be appreciated that the compounds, compositions and methods of the present invention may be beneficial to prevent and/or treat stroke or recovery from stroke.

Amytrophic Lateral Sclerosis

Amyotrophic lateral sclerosis (ALS) (also known as Lou Gehrig's disease, Charcot disease and motor neuron disease), involves the death of neurons responsible for controlling voluntary muscles. ALS is characterized by stiff muscles, muscle twitching, and gradually worsening weakness due to muscle wasting; this results in difficulty speaking, swallowing, and eventually breathing.

It may be appreciated that the compounds, compositions and methods of the present invention may be beneficial to prevent and/or treat ALS or its neurological symptoms.

Multiple Sclerosis

Multiple sclerosis (MS) affects the nerves in the brain and spinal cord, causing a wide range of symptoms including problems with muscle movement, problems with mobility and balance, numbness and tingling, blurring of vision (typically there is loss of vision in one eye) and fatigue. It may be appreciated that the compounds, compositions and methods of the present invention may be beneficial to prevent and/or treat MS or its neurological symptoms.

Parkinson's Disease

Parkinson's disease is a degenerative disorder of the central nervous system mainly affecting the motor system. In the early course of the disease, the most obvious symptoms are movement-related; these include tremor at rest, rigidity, slowness of movement and difficulty with walking and gait. Later in the course of the disease, thinking and behavioral problems may arise, with dementia commonly occurring in the advanced stages of the disease. Other symptoms include depression, sensory, sleep and emotional problems.

It may be appreciated that the compounds, compositions and methods of the present invention may be beneficial to prevent and/or treat Parkinson's disease or its neurological symptoms.

Alzheimer's Disease

Alzheimer's disease (AD) is a progressive neurodegenerative disorder. Alzheimer's disease is the most common cause of dementia. Symptoms include memory loss and difficulties with thinking, problem-solving or language. The mini mental state examination (MMSE) is an example of one of the tests used to diagnose Alzheimer's disease.

It may be appreciated that the compounds, compositions and methods of the present invention may be beneficial to prevent and/or treat AD or its neurological symptoms.

Huntington's Disease

Huntington's disease is an inherited condition that damages certain nerve cells in the brain. Huntington's disease affects muscle coordination and leads to mental decline and behavioral symptoms. The earliest symptoms are often subtle problems with mood or cognition. A general lack of coordination and an unsteady gait often follow. As the disease advances, uncoordinated, jerky body movements become more apparent, along with a decline in mental abilities and behavioral symptoms. Physical abilities gradually worsen until coordinated movement becomes difficult. Mental abilities generally decline into dementia.

It may be appreciated that the compounds, compositions and methods of the present invention may be beneficial to prevent and/or treat Huntington's disease or its neurological symptoms.

Inherited Metabolic Disorders Affecting the Brain and Nervous System

Inherited metabolic disorders are a range of diseases caused by defective genes. Typically the defective gene(s) results in a defect in an enzyme or in a transport protein which results in a block in the way that a compound is processed by the body such that there is a toxic accumulation of the compound. Inherited metabolic disorders can affect any organ and usually affect more than one. Symptoms often tend to be nonspecific and usually relate to major organ dysfunction or failure. The onset and severity of a metabolic disorder may be exacerbated by environmental factors, such as diet and concurrent illness.

GLUT 1 Deficiency Syndrome

Glucose transporter type 1 (Glut1) deficiency syndrome is a genetic metabolic disorder involving the GLUT1 protein which transports glucose across the blood-brain barrier or the boundary separating tiny blood vessels from brain tissue. The most common symptom is seizures (epilepsy), which usually begin within the first few months of life. Additional symptoms that can occur include varying degrees of cognitive impairment and movement disorders characterized by ataxia, dystonia, and chorea. Glut1 deficiency syndrome may be caused by mutations in the SLC2A1 gene which produce GLUT1 protein.

Pyruvate Dehydrogenase Complex Deficiency

Pyruvate dehydrogenase complex deficiency (pyruvate dehydrogenase deficiency or PDCD) is a neurodegenerative disorder associated with abnormal mitochondrial metabolism and disrupted carbohydrate metabolism. PDCD is characterized by the buildup of lactic acid in the body and a variety of neurological problems. Signs and symptoms of this condition usually first appear shortly after birth, and they can vary widely among affected individuals. The most common feature is a potentially life-threatening buildup of lactic acid (lactic acidosis), which can cause nausea, vomiting, severe breathing problems, and an abnormal heartbeat. Other symptoms include: neurological problems; delayed development of mental abilities and motor skills such as sitting and walking; intellectual disability; seizures; weak muscle tone (hypotonia); poor coordination, and difficulty walking. Some affected individuals have abnormal brain structures, such as underdevelopment of the tissue connecting the left and right halves of the brain (corpus callosum), wasting away (atrophy) of the exterior part of the brain known as the cerebral cortex, or patches of damaged tissue (lesions) on some parts of the brain.

It may be appreciated that the compounds, compositions and methods of the present invention may be beneficial to prevent and/or treat inherited metabolic diseases or conditions affecting the brain and/or nervous system.

Psychogenic Conditions and Disorders

Psychogenic conditions and diseases relate to emotional or mental stressors which may affect brain function. Psychogenic disorders are divided into: (i) dissociation (with memory, consciousness and self-identity impairment), and (ii) disturbances with somatizations, divided into somatoform (unconscious), factitious (voluntary search for patient's role) and malingering (searching for material gain). Normal activity in certain brain areas of the motor or sensory cortex is blocked by other brain areas related to emotional integration in the anterior cingular and orbitofrontal cortex.

Bipolar Disorder

Bipolar disorder is a brain disorder that causes unusual shifts in mood, energy, activity levels, and the ability to carry out day-to-day tasks. Bipolar disorder is characterized by periods of elevated mood and periods of depression. Bipolar disorder can be diagnosed using the guidelines from the Diagnostic and Statistical Manual of Mental Disorders (DSM) or the World Health Organization's International Statistical Classification of Diseases and Related Health Problems.

Schizophrenia

Schizophrenia is a chronic, severe, and disabling brain disorder in which individuals interpret reality abnormally. Schizophrenia may result in some combination of hallucinations, hearing voices, delusions, and extremely disordered thinking and behavior. Schizophrenia can be diagnosed using the guidelines from the Diagnostic and Statistical Manual of Mental Disorders (DSM) or the World Health Organization's International Statistical Classification of Diseases and Related Health Problems.

Epilepsy

Epilepsy is a neurological disorder in which nerve cell activity in the brain becomes disrupted, causing seizures or periods of unusual behavior, sensations and sometimes loss of consciousness.

Stress

In biology and psychology, the term "stress" refers to the consequence of the failure of a human or other animal to respond appropriately to physiological, emotional, or physical threats, whether actual or imagined. The psychobiological features of stress may present as manifestations of oxidative stress, i.e., an imbalance between the production and manifestation of reactive oxygen species and the ability of a biological system readily to detoxify the reactive intermediates or to repair the resulting damage. Disturbances in the normal redox state of tissues can cause toxic effects through the production of peroxides and free radicals that damage all of the components of the cell, including proteins, lipids, and DNA. Some reactive oxidative species can even act as messengers through a phenomenon called "redox signaling."

Motivational Performance or Mental Energy

"Motivational performance" is synonymous with the terms "mental energy" and related terms of "volition", "will-power", "time-on-task", "persistence", "self-control", "sustained effort", and "self-efficacy". All these terms relate to a person's drive to initiate and do things. Motivational performance is linked to subjectively perceived self-efficacy and well-being.

Motivational performance describes the subjective perception of mental resources available, which in turn is linked to cognitive functioning. For example, motivational performance is reduced in states of depression and anxiety. Measurement of "motivational performance" can be by both motor tasks and cognitive tasks. Typically, these motor tasks and cognitive tasks are performed under incentivized conditions, meaning that individuals get an incentive depending on their performance of the task.

It may be appreciated that the compounds, compositions and methods of the present invention may be beneficial to prevent and/or treat psychogenic disease conditions listed above and other conditions related to stress and motivational performance, in particular, to maintain or improve brain or nervous system function.

The terms "cognitive impairment" and "cognition impairment" refer to disorders that give rise to impaired cognition, in particular disorders that primarily affect learning, memory, perception, and/or problem solving.

Cognitive impairment may occur in a subject after intensive care. Cognitive impairment may occur as part of the ageing process, e.g. mild cognitive impairment (MCI).

The term "cognition" refers to the set of all mental abilities and processes, including knowledge, attention, memory and working memory, judgment and evaluation, reasoning and "computation", problem solving and decision making, comprehension and production of language. Levels of and improvements in cognition can be readily assessed by the skilled person using any suitable neurological and cognitive tests that are known in the art, including cognitive tests designed to assess speed of information processing, executive function and memory. Suitable example tests include Mini Mental State Examination (MMSE), Cambridge Neuropsychological Test Automated Battery (CANTAB), Alzheimer's Disease Assessment Scale-cognitive test (ADAScog), Wisconsin Card Sorting Test, Verbal and Figural Fluency Test and Trail Making Test, Wechsler Memory scale (WMS), immediate and delayed Visual Reproduction Test (Trahan et al. Neuropsychology, 1988 19 (3) p. 173-89), the Rey Auditory Verbal Learning Test (RAVLT) (Ivnik, R J. et al. Psychological Assessment: A Journal of Consulting and Clinical Psychology, 1990 (2): p. 304-312), electroencephalography (EEG), magnetoencephalography (MEG), Positron Emission Tomography (PET), Single Photon Emission Computed Tomography (SPECT), Magnetic Resonance Imaging (MRI), functional Magnetic Resonance Imaging (fMRI), computerized tomography and long-term potentiation.

EEG, a measure of electrical activity of the brain, is accomplished by placing electrodes on the scalp at various landmarks and recording greatly amplified brain signals. MEG is similar to EEG in that it measures the magnetic fields that are linked to electrical fields. MEG is used to measure spontaneous brain activity, including synchronous waves in the nervous system.

PET provides a measure of oxygen utilisation and/or glucose metabolism. In this technique, a radioactive positron-emitting tracer is administered, and tracer uptake by the brain is correlated with brain activity. These tracers emit gamma rays which are detected by sensors surrounding the head, resulting in a 3D map of brain activation. As soon as the tracer is taken up by the brain, the detected radioactivity occurs as a function of regional cerebral blood flow. During activation, an increase in cerebral blood flow and neuronal glucose metabolism can be detected within seconds.

Suitable analysis can also be based on neuropsychiatric testing, clinical examinations and individual complaints of loss of cognitive function (e.g. subjective memory loss). Further suitable tests may be based on assessments of locomotion, memory and attention, seizure susceptibility, and social interaction and/or recognition.

Memory disorders are the result of neurological damage to the brain structures such that the storage, retention and recollection of memories are hindered. Memory disorders can be progressive with age (e.g. Alzheimer's disease), or they can be immediately resulting, for example, from a head injury. Levels of and improvements in memory disorders can be readily assessed by the skilled person using any suitable tests that are known in the art such as Alzheimer's Disease Assessment Scale-cognitive test (ADAScog), Mini Mental State Examination (MMSE), computerized tomography (CT) scan, Magnetic Resonance Imaging (MRI), Single Photon Emission Computed Tomography (SPECT), Positron Emission Tomography (PET), and electroencephalography (EEG).

EMBODIMENTS

The present invention provides compositions containing at least one N-acetyl cysteine or functional derivative thereof and at least one nicotinamide riboside or NAD+ precursor.

Each of the compounds can be administered at the same time as the other compounds (i.e. as a single unit) or separated by a time interval (i.e., in separate units). The present disclosure further provides a kit comprising at least one N-acetylcysteine or functional derivative thereof, and at least one nicotinamide riboside or NAD+ precursor for admixing to form one or more of the compositions disclosed herein and/or for use in one or more of the methods disclosed herein, for example in separate containers as two or more liquid solutions or dried powders. In some embodiments, one or more of these compounds can be isolated compounds.

As used herein, "nicotinamide riboside" includes L-valine and L-phenylalanine esters of nicotinamide riboside. Non-limiting examples of suitable NAD+ precursors include Tryptophan, Nicotinic Acid, Nicotinamide, reduced form of nicotinamide riboside (NRH), Nicotinamide Mononucleotide (NMN), Trigonelline, Nicotinic acid mononucleotide, Nicotinic acid riboside, and mixtures thereof. The present disclosure is not limited to a specific embodiment of the NAD+ precursor, and the NAD+ precursor can be any compound that stimulates NAD+.

The nicotinamide riboside can be provided by any of the compositions disclosed by U.S. Pat. Nos. 8,383,086 and 8,197,807, each entitled "Nicotinamide riboside kinase compositions and methods for using the same," and U.S. Pat. No. 8,106,184 entitled "Nicotinoyl riboside compositions and methods of use," each incorporated herein by reference in its entirety.

For non-human mammals such as rodents, some embodiments comprise administering an amount of the composition that provides 1.0 mg to 1.0 g of the nicotinamide riboside/kg of body weight of the non-human mammal, preferably 10 mg to 500 mg of the nicotinamide riboside/kg of body weight of the non-human mammal, more preferably 25 mg to 400 mg of the nicotinamide riboside/kg of body weight of the mammal, most preferably 50 mg to 300 mg of the nicotinamide riboside/kg of body weight of the non-human mammal.

For humans, some embodiments comprise administering an amount of the composition that provides 1.0 mg to 10.0 g of the nicotinamide riboside/kg of body weight of the human, preferably 10 mg to 5.0 g of the nicotinamide riboside/kg of body weight of the human, more preferably 50 mg to 2.0 g of the nicotinamide riboside/kg of body weight of the human, most preferably 100 mg to 1.0 g of the r nicotinamide riboside/kg of body weight of the human.

In some embodiments, the nicotinamide riboside or NAD+ precursor can be administered in an amount of about 0.001 mg/day to about 2000 mg/day, preferably about 0.001 mg/day to about 1000 mg/day, more preferably about 0.001 mg/day to about 750 mg/day, even more preferably about 0.001 mg/day to about 500 mg/day, most preferably about 0.001 mg/day to about 250 mg/day, for example about 0.001 mg/day to about 100 mg/day, about 0.001 mg/day to about 75 mg/day, about 0.001 mg/day to about 50 mg/day, about 0.001 mg/day to about 25 mg/day, about 0.001 mg/day to about 10 mg/day, or about 0.001 mg/day to about 1 mg/day. Of course, the daily dose can be administered in portions at various hours of the day. However, in any given case, the amount of compound administered will depend on such factors as the solubility of the active component, the formulation used, subject condition (such as weight), and/or the route of administration. For example, the daily doses of nicotinamide riboside disclosed above are non-limiting and, in some embodiments, may be different; in particular, the compositions disclosed herein can be utilized as an acute care food for special medical purposes (FSMP) and contain up to about 2.0 mg nicotinamide riboside/day.

A "functional derivative" of N-acetylcysteine is an N-acetylcysteine functional derivative that is effective in an individual in by itself or in conjunction with glycine (or a functional derivative thereof) to increase intracellular GSH levels.

The N-acetylcysteine or functional derivative thereof can be administered in an amount of about 0.1-100 milligram (mg) of N-acetylcysteine (NAC) or functional derivative thereof per kilogram (kg) of body weight of the subject.

In a particular non-limiting example, the daily doses for a 60 kg subject can be as follows:

NAC or derivative thereof: 6 to 6,000 mg/day

Nicotinamide Riboside: 0.001 to 1,000 mg/day

The nicotinamide riboside or NAD+ precursor and the N-acetylcysteine or functional derivative may be formulated in a particular ratio. In some embodiments, the formulation may comprise these components in the following exemplary ratios: 1:1, 1:2, 1:3, 1:4, 1:5, 1:6, 1:7, 1:8, 1:9, 1:10, 1:12, 1:15, 1:20, 1:25, 1:30, 1:35, 1:40, 1:45, 1:50, 1:55, 1:60, 1:65, 1:70, 1:75, 1:80, 1:85, 1:90, 1:95, 1:100, 1:150, 1:200, 1:300, 1:400, 1:500, 1:600, 1:750, 1:1000, and 1:10,000. In particular embodiments, the formulation may comprise these components in the following weight percentages (either the same for both or different weight percentages for each): 1%, 2%, 3%, 4%, 5%, 6%, 7%, 8%, 9%, 10%, 12%, 15%, 20%, 25%, 30%, 40%, 45%, 50%, 55%, 60%, 65%, 70%, 75%, 80%, 85%, 90%, 95%, 97%, or 99%, for example.

As used herein, a "composition consisting essentially of at least one N-acetyl cysteine or functional derivative thereof and at least one nicotinamide riboside or NAD+ precursor does not include, or is substantially free of, or completely free of, any additional compound that affects NAD+ production other than the nicotinamide riboside". In a particular non-limiting embodiment, the composition consists of the N-acetyl cysteine or functional derivative thereof and the nicotinamide riboside or NAD+ precursor and an excipient or one or more excipients.

As used herein, "substantially free" means that any of the other compounds present in the composition is no greater than 1.0 wt. % relative to the amount of nicotinamide riboside, preferably no greater than 0.1 wt. % relative to the amount of nicotinamide riboside, more preferably no greater than 0.01 wt. % relative to the amount of nicotinamide riboside, most preferably no greater than 0.001 wt. % relative to the amount of nicotinamide riboside.

In some embodiments, the composition is substantially free or completely free of Glycine or functional derivatives, in particular it is free of exogenous glycine.

In an embodiment, the at least one glycine or functional derivative thereof is selected from the group consisting of L-glycine, L-glycine ethyl ester, D-Allylglycine; N-[Bis (methylthio) methylene] glycine methyl ester; Boc-allyl-Gly-OH (dicyclohexylammonium) salt; Boc-D-Chg-OH; Boc-Chg-OH; (R)-N-Boc-(2'-chlorophenyl) glycine; Boc-L-cyclopropylglycine; Boc-L-cyclopropylglycine; (R)-N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl) glycine; N-(4-fluorophenyl)-N-(methylsulfonyl) glycine; Fmoc-N-(2,4-dimethoxybenzyl)-Gly-OH; N-(2-Furoyl) glycine; L-a-Neopentylglycine; D-Propargylglycine; sarcosine; Z-a-Phosphonoglycine trimethyl ester, and mixtures thereof.

In another aspect, the present disclosure provides a method of improving cognitive function. An increase in GSH can improve glucose uptake/utilization in the barin, providing one or more benefits to the individual, for example a human (e.g., a human undergoing medical treatment), a pet or a horse (e.g., a pet or horse undergoing medical treatment), or cattle or poultry (e.g., cattle or poultry being used in agriculture) with respect to prevention or treatment of neurological disease and/or condition.

The method comprises administering to an individual an effective amount of a combination of at least one N-acetyl-cysteine or functional derivative thereof, and at least one nicotinamide riboside or NAD+ precursor. The cognitive function can be selected from the group consisting of perception, memory, attention, speech comprehension, speech generation, reading comprehension, creation of imagery, learning, reasoning, and combinations thereof. In an embodiment, the individual does not have a cognitive disorder; alternatively, the individual has a cognitive disorder. The individual can be elderly and/or can have cognitive decline associated with aging.

Another aspect of the present invention is a method for improving glucose uptake/utilization in the brain in a mammal in need thereof, comprising administering to the mammal a composition comprising at least one N-acetyl cysteine or functional derivative thereof and at least one nicotinamide riboside or NAD+ precursor in an amount effective to improve glucose uptake/utilization in the brain. The method can promote the increase of intracellular levels of GSH and/or NAD+ in cells and tissues for improving cell and tissue survival and overall cell and tissue health, for example, in neuronal cells and tissues, especially in the brain.

Nicotinamide adenine dinucleotide (NAD+) is considered a coenzyme, and essential cofactor in cellular redox reactions to produce energy. It plays critical roles in energy metabolism, as the oxidation of NADH to NAD+ facilitates hydride-transfer, and consequently ATP generation through mitochondrial oxidative phosphorylation. It also acts as a degradation substrate for multiple enzymes (Canto, C., K. J. Menzies, and J. Auwerx, 2015. NAD(+) Metabolism and the Control of Energy Homeostasis: A Balancing Act between Mitochondria and the Nucleus. Cell Metab. 22 (1): 31-53.)

Mammalian organisms can synthesize NAD+ from four different sources. First, NAD+ can be obtained from tryptophan through the 10-step de novo pathway. Secondly, Nicotinic acid (NA) can also be transformed into NAD+ through the 3-step Preiss-Handler path, which converges with the de novo pathway. Thirdly, intracellular NAD+ salvage pathway from nicotinamide (NAM) constitutes the main path by which cells build NAD+, and occurs through a 2-step reaction in which NAM is first transformed into NAM-mononucleotide (NMN) via the catalytic activity of the NAM-phosphoribosyltransferase (NAMPT) and then converted to NAD+ via NMN adenylyltransferase (NM-NAT) enzymes. Finally, Nicotinamide Riboside (NR) constitutes yet a fourth path to NAD+, characterized by the initial phosphorylation of NR into NMN by NR kinases (NRKs)

In each of the compositions and methods disclosed herein, the composition is preferably a food product or beverage product, including food additives, food ingredients, functional foods, dietary supplements, medical foods, nutraceuticals, oral nutritional supplements (ONS) or food supplements. For example, the composition can be selected from the group consisting of a food product, a food for special medical purposes (FSMP), a nutritional supplement, a ready to drink formula, a dairy-based drink, a low-volume liquid supplement (i.e., about 50 ml or less, for example about 30 ml or less), powder formats for liquid reconstitution, a meal replacement beverage, and combinations thereof.

The composition can be administered at least one day per week, preferably at least two days per week, more preferably at least three or four days per week (e.g., every other day), most preferably at least five days per week, six days per week, or seven days per week. The time period of administration can be at least one week, preferably at least one month, more preferably at least two months, most preferably at least three months, for example at least four months. In some embodiments, dosing is at least daily; for example, a subject may receive one or more doses daily, in an embodiment a plurality of doses per day. In some embodiments, the administration continues for the remaining life of the individual. In other embodiments, the administration occurs until no detectable symptoms of the medical condition remain. In specific embodiments, the administration occurs until a detectable improvement of at least one symptom occurs and, in further cases, continues to remain ameliorated.

The compositions disclosed herein may be administered to the subject enterally, e.g., orally, or parenterally. Non-limiting examples of parenteral administration include intravenously, intramuscularly, intraperitoneally, subcutaneously, intraarticularly, intrasynovially, intraocularly, intrathecally, topically, and inhalation. As such, non-limiting examples of the form of the composition include natural foods, processed foods, natural juices, concentrates and extracts, injectable solutions, microcapsules, nano-capsules, liposomes, plasters, inhalation forms, nose sprays, nosedrops, eyedrops, sublingual tablets, and sustained-release preparations.

The compositions disclosed herein can use any of a variety of formulations for therapeutic administration. More particularly, pharmaceutical compositions can comprise appropriate pharmaceutically acceptable carriers or diluents and may be formulated into preparations in solid, semi-solid, liquid or gaseous forms, such as tablets, capsules, powders, granules, ointments, solutions, suppositories, injections, inhalants, gels, microspheres, and aerosols. As such, administration of the composition can be achieved in various ways, including oral, buccal, rectal, parenteral, intraperitoneal, intradermal, transdermal, and intratracheal administration. The active agent may be systemic after administration or may be localized by the use of regional administration, intramural administration, or use of an implant that acts to retain the active dose at the site of implantation.

In pharmaceutical dosage forms, the compounds may be administered as their pharmaceutically acceptable salts. They may also be used in appropriate association with other pharmaceutically active compounds. The following methods and excipients are merely exemplary and are in no way limiting.

For oral preparations, the compounds can be used alone or in combination with appropriate additives to make tablets, powders, granules or capsules, for example, with conventional additives, such as lactose, mannitol, corn starch or potato starch; with binders, such as crystalline cellulose, cellulose functional derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents.

The compounds can be formulated into preparations for injections by dissolving, suspending or emulsifying them in an aqueous or non-aqueous solvent, such as vegetable or other similar oils, synthetic aliphatic acid glycerides, esters of higher aliphatic acids or propylene glycol; and if desired, with conventional, additives such as solubilizers, isotonic agents, suspending agents, emulsifying agents, stabilizers and preservatives.

The compounds can be utilized in an aerosol formulation to be administered by inhalation. For example, the compounds can be formulated into pressurized acceptable propellants such as dichlorodifluoromethane, propane, nitrogen and the like.

Furthermore, the compounds can be made into suppositories by mixing with a variety of bases such as emulsifying bases or water-soluble bases. The compounds can be administered rectally by a suppository. The suppository can include a vehicle such as cocoa butter, carbowaxes and polyethylene glycols, which melt at body temperature, yet are solidified at room temperature.

Unit dosage forms for oral or rectal administration such as syrups, elixirs, and suspensions may be provided wherein each dosage unit, for example, teaspoonful, tablespoonful, tablet or suppository, contains a predetermined amount of the composition. Similarly, unit dosage forms for injection or intravenous administration may comprise the compounds in a composition as a solution in sterile water, normal saline or another pharmaceutically acceptable carrier, wherein each dosage unit, for example, mL or L, contains a predetermined amount of the composition containing one or more of the compounds.

Compositions intended for a non-human animal include food compositions to supply the necessary dietary requirements for an animal, animal treats (e.g., biscuits), and/or dietary supplements. The compositions may be a dry composition (e.g., kibble), semi-moist composition, wet composition, or any mixture thereof. In one embodiment, the composition is a dietary supplement such as a gravy, drinking water, beverage, yogurt, powder, granule, paste, suspension, chew, morsel, treat, snack, pellet, pill, capsule, tablet, or any other suitable delivery form. The dietary supplement can comprise a high concentration of the UFA and NORC, and B vitamins and antioxidants. This permits the supplement to be administered to the animal in small amounts, or in the alternative, can be diluted before administration to an animal. The dietary supplement may require admixing, or can be admixed with water or other diluent prior to administration to the animal.

EXAMPLES

Example 1

The following non-limiting prophetic example discusses experimental data that is being investigated and/or will be investigated to further support the compounds, compositions, and methods disclosed herein.

Menadione-induced oxidative stress in primary rat astrocytes and/or neurons treated with/without BSO (GSH synthesis inhibitor)+/−NAC and/or +/−NR_ Seahorse measurement (mitochondrial respiratory rate)

Synergistic reduction of oxidative stress and oxidative stress-derived effects+/−NAC+/−NR_ as measured by CellROX, Primary rat astrocytes treated with/without BSO (GSH synthesis inhibitor), +/−NAC and/or +/−NR_ GSH production Primary rat astrocytes treated+/−NAC and/or +/−NR_ NAD+/NADH redox status Primary rat astrocytes and neurons treated+/−NAC and/or +/−NR_ Glucose uptake measurement Primary rat neurons treated+/−NAC and/or +/−NR at baseline and after stimulation_ Synaptic Plasticity genes.

Figure 1:
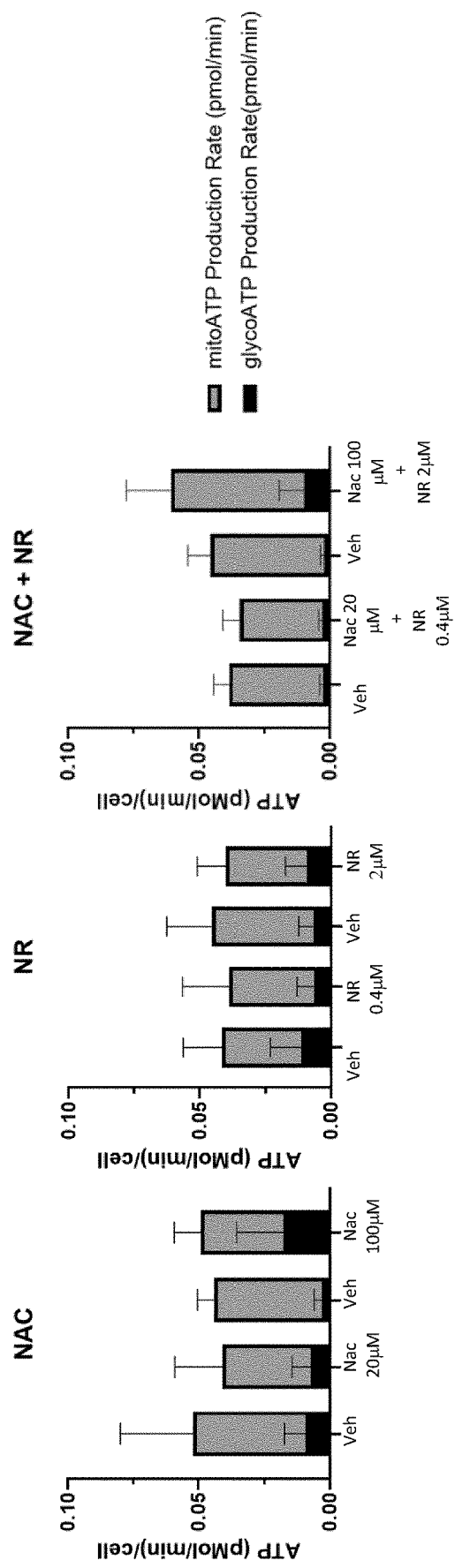
FIG. 1: NAC+NR increase ATP production in rat primary cortical neurons as measured by ATP real time production rate in a Seahorse XFe96 Analyzer

Example 2: NAC+NR Increase ATP Production in Rat Primary Cortical Neurons as Measured by ATP Real Time Production Rate in a Seahorse XFe96 Analyzer Primary rat cortical neurons were treated for 48 hours and analysed in aCSF (120 mM NaCl, 3.5 mM KCl, 1.3 mM CaCl2, 0.4 mM KH2PO4, 1 mM MgCl2, 5 mM HEPES)+10 mM glucose, 10 mM sodium pyruvate, pH 7.4 in millipore water. The results are shown in FIG. 1.

Figure 2:
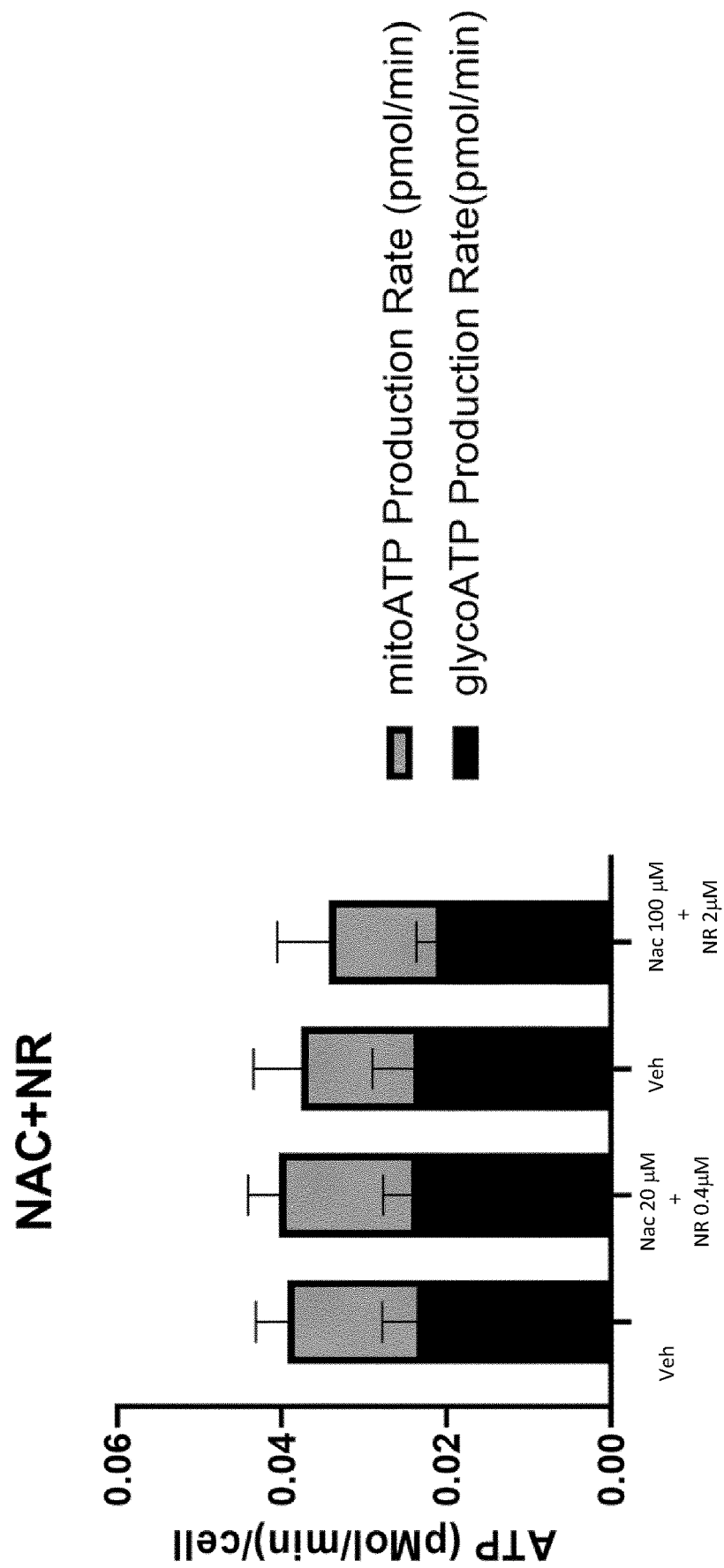
FIG. 2: NAC+NR does not increase ATP production in rat primary astrocytes as measured by ATP real time production rate in a Seahorse XFe96 Analyzer

Example 3: NAC+NR does not Increase ATP Production in Rat Primary Astrocytes as Measured by ATP Real Time Production Rate in a Seahorse XFe96 Analyzer NAC+NR does not increase ATP production in rat primary astrocytes as measured by ATP real time production rate in a Seahorse XFe96 Analyzer Primary rat astrocytes were treated and analysed in DMEM+5 mM glucose, no phenol red, no glutamine, no pyruvate and no FBS, pH 7.4. The results are shown in FIG. 2.

Example 4: NAC+NR Increase Glucose Uptake in Rat Primary Astrocytes as Measured by Glucose Uptake-Glo™ Assay A Seahorse XFe96 Analyzer was used to measure ATP real-time production rate by glycolysis and mitochondrial oxidation. Primary rat astrocytes were plated at 13,000 cells/well and primary rat cortical neurons at 20,000 cells/well of a Seahorse plate. The calibration plate was hydrated overnight in a non-$CO_2$ incubator. For the ATP rate assay test, 1.5 µM oligomycin, 1 µM+0.5 µM rotenone/antimycin were used in subsequent port-injections and the measurements were normalized to cells counts. The wave report generator (Agilent) was used for analysis.

Normalization was done by using DAPI as nuclear staining of cells and the counting by MetaXpress® High-Content Image Acquisition and Analysis Software.

Glucose uptake was measured with the Glucose Uptake-Glo Assay (Promega). Cells were incubated for 10 minutes in glucose-deprived medium supplemented with 1 mmol/L 2-Deoxy-D-Glucose (2DG) and luminescence intensity (Relative light unit, RLU) was measured according to the manufacturer's instructions with a Varioskan LUX Multimode Microplate Reader.

Figure 3:
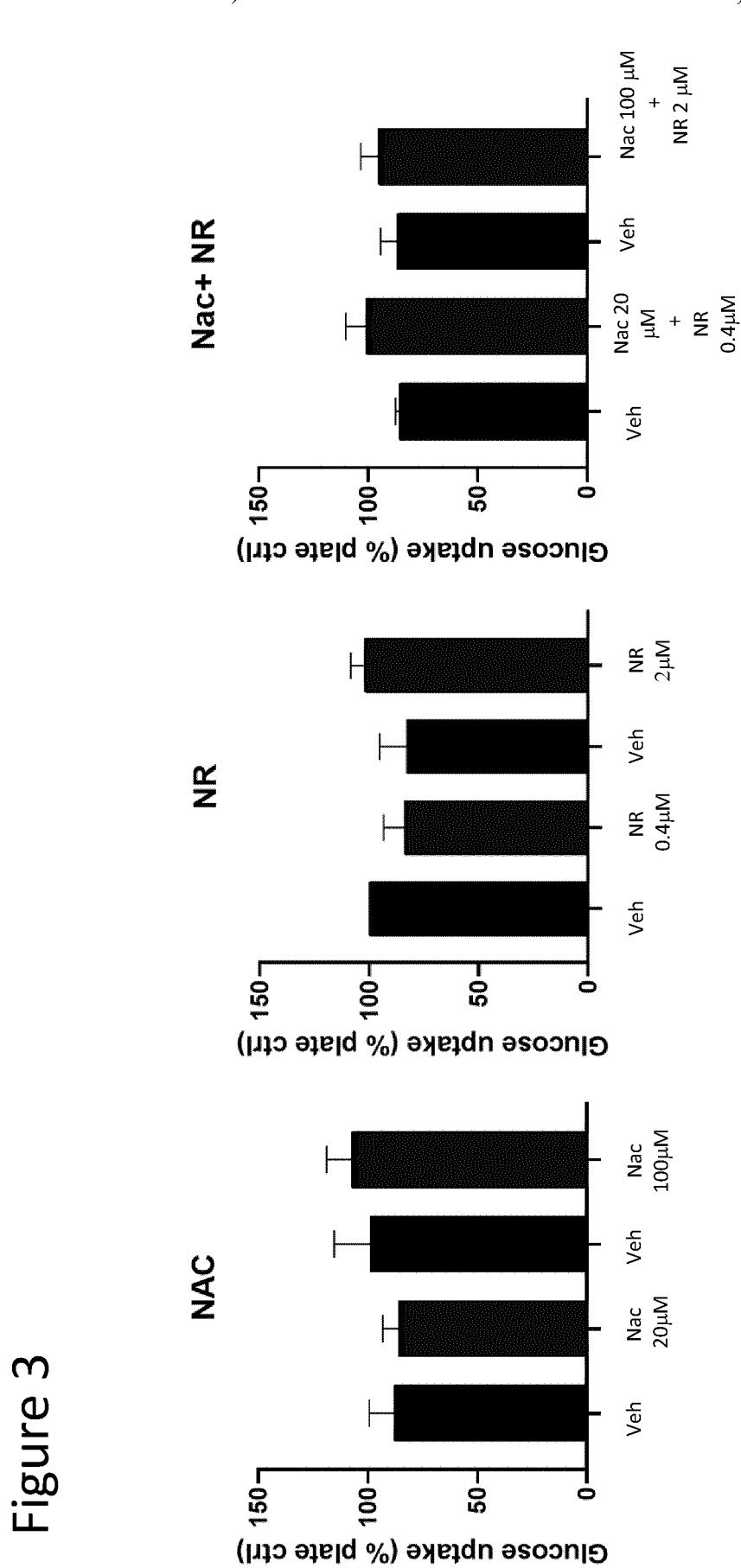
FIG. 3: NAC+NR increase Glucose Uptake in rat primary astrocytes as measured by Glucose Uptake-Glo™ Assay

Normalization was done by protein quantification with BCA method. 3.5 ml of cell lysate were taken after the addition of the stop buffer but before the addition of luciferin. The results are shown in FIG. 3.

The data in these experiments show that pentose phosphate pathway (PPP) is an alternative way of glucose use that do not generate ATP but rather supplying cells with ribose-5-phosphate and NADPH for detoxification of intracellular ROS, reductive biosynthesis, and ribose biogenesis.

The invention claimed is:

1. A method to prevent and/or treat neurological diseases or conditions comprising administering to a subject in need of same a composition comprising a combination of N-acetylcysteine and nicotinamide riboside.

2. The method according to claim 1, wherein the composition is administered orally or enterally.

3. The method according to claim 1, wherein said composition is used to i) prevent and/or treat brain energy deficiency diseases or conditions; ii) to maintain or improve neurological function in a subject; or iii) to enhance recovery of neurological function after injury or surgery.

4. The method according to claim 1, to maintain or improve brain function in the subject.

5. The method according to claim 4, wherein the brain function is motivational performance.

6. The method according to claim 1, wherein the neurological disease and/or condition is the result of damage to the brain, spinal column or nerves caused by illness or injury.

7. The method according to claim 1, wherein the disease and condition is selected from the group consisting of: migraine, memory disorder, age-related memory disorder, brain injury, neurorehabilitation, stroke and post-stroke, amyloid lateral sclerosis, multiple sclerosis, cognitive impairment, mild cognitive impairment (MCI), cognitive impairment post-intensive care, age-induced cognition impairment, Alzheimer's disease, Parkinson's disease, Huntingdon's disease, inherited metabolic disorders; bipolar disorder, schizophrenia, epilepsy, stress and motivational performance.

8. The method according to claim 1, wherein said composition is a nutritional composition selected from a: food or beverage product, or food supplements.

9. The method according to claim 1, wherein said composition does not contain glycine or functional derivative.

10. The method according to claim 1, wherein the subject is selected from the group consisting of: human, dog, cat, cow, horse, pig, and sheep.

11. The method according to claim 1, wherein the subject is a human.

12. A method of maintaining cognitive function in a healthy older adult, the method comprising administering to the healthy older adult an effective amount of a combination of a Nicotinamide riboside and N-acetyl cysteine.

13. The method according to claim 12, wherein the healthy older adult is elderly.

14. A method for improving glucose uptake/utilization in the brain in a mammal in need thereof, comprising administering to the mammal a composition comprising a combination of N-acetyl cysteine and nicotinamide riboside in an amount effective to improve glucose uptake/utilization in the brain.

15. The method according to claim 7, wherein the disease and condition is an inherited metabolic disorder, and wherein the disease and condition is selected from the group consisting of glucose transporter type 1 deficiency syndrome and pyruvate dehydrogenase complex deficiency.

* * * * *